US009690085B2

(12) United States Patent
Dohi

(10) Patent No.: US 9,690,085 B2
(45) Date of Patent: Jun. 27, 2017

(54) MICROSCOPE ILLUMINATION APPARATUS, MICROSCOPE, AND MICROSCOPE ILLUMINATION METHOD

(71) Applicant: OLYMPUS CORPORATION, Shibuya-ku, Tokyo (JP)

(72) Inventor: Masahito Dohi, Musashino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/607,877

(22) Filed: Jan. 28, 2015

(65) Prior Publication Data

US 2015/0212307 A1    Jul. 30, 2015

(30) Foreign Application Priority Data

Jan. 30, 2014  (JP) ................................ 2014-015827
Sep. 18, 2014  (JP) ................................ 2014-190168

(51) Int. Cl.
| G02B 21/26 | (2006.01) |
| G02B 26/08 | (2006.01) |
| G02B 21/36 | (2006.01) |
| G02B 21/06 | (2006.01) |
| G02B 21/33 | (2006.01) |

(52) U.S. Cl.
CPC .............. *G02B 21/06* (2013.01); *G02B 21/26* (2013.01); *G02B 21/33* (2013.01); *G02B 21/361* (2013.01); *G02B 26/0808* (2013.01)

(58) Field of Classification Search
CPC ........ G02B 21/06; G02B 21/26; G02B 21/33; G02B 21/361; G02B 26/0808

USPC ......................... 359/385, 387, 389
See application file for complete search history.

(56) References Cited

U.S. PATENT DOCUMENTS

| 3,999,855 A | * | 12/1976 | Hirschfeld ........... G02B 21/084 |
| | | | 250/574 |
| 6,992,820 B2 | | 1/2006 | Abe et al. |
| 2003/0030902 A1 | | 2/2003 | Fukushima et al. |

(Continued)

FOREIGN PATENT DOCUMENTS

| JP | 06084760 A | 3/1994 |
| JP | 08334701 A | 12/1996 |

(Continued)

OTHER PUBLICATIONS

Extended European Search Report dated Jun. 10, 2015, issued in counterpart European Application No. 15153158.9.

*Primary Examiner* — Frank Font
(74) *Attorney, Agent, or Firm* — Holtz, Holtz & Volek PC

(57) ABSTRACT

A microscope illumination apparatus includes an optical conversion unit that converts laser light incident thereon from a light source to laser light that has an NA and whose main optical axis is distributed on a conical surface that widens at a predetermined angle with respect to an incident optical axis of the laser light, and from which the laser light exits, and an optical device that has no refractive power and that deflects the laser light, which has exited the optical conversion unit, in a direction parallel to the incident optical axis, wherein the microscope illumination apparatus focuses laser light that has exited the optical device at a pupil position of a focusing lens for illuminating a specimen or a position that is conjugate with the position.

12 Claims, 14 Drawing Sheets

(56) References Cited

U.S. PATENT DOCUMENTS

| | | | | |
|---|---|---|---|---|
| 2004/0218262 A1* | 11/2004 | Chuang | ............... | G01N 21/8806 |
| | | | | 359/366 |
| 2006/0146384 A1* | 7/2006 | Schultz | .................. | G02B 27/09 |
| | | | | 359/9 |
| 2007/0014002 A1* | 1/2007 | Vodyanoy | ............ | G02B 21/125 |
| | | | | 359/387 |
| 2009/0128824 A1* | 5/2009 | Leitgeb | ............. | G01N 21/4795 |
| | | | | 356/446 |
| 2009/0168159 A1* | 7/2009 | Roorda | ............. | G01N 21/6458 |
| | | | | 359/387 |
| 2011/0304723 A1* | 12/2011 | Betzig | .................. | G02B 21/002 |
| | | | | 348/79 |
| 2013/0120563 A1* | 5/2013 | Terada | ................. | G01B 11/022 |
| | | | | 348/135 |
| 2014/0104407 A1 | 4/2014 | Ouchi | | |

FOREIGN PATENT DOCUMENTS

| | | |
|---|---|---|
| JP | 2000221407 A | 8/2000 |
| JP | 2001272606 A | 10/2001 |
| JP | 2003131141 A | 5/2003 |
| JP | 2007334319 A | 12/2007 |
| WO | 2006109561 A1 | 10/2006 |
| WO | 2013001805 A1 | 1/2013 |

* cited by examiner

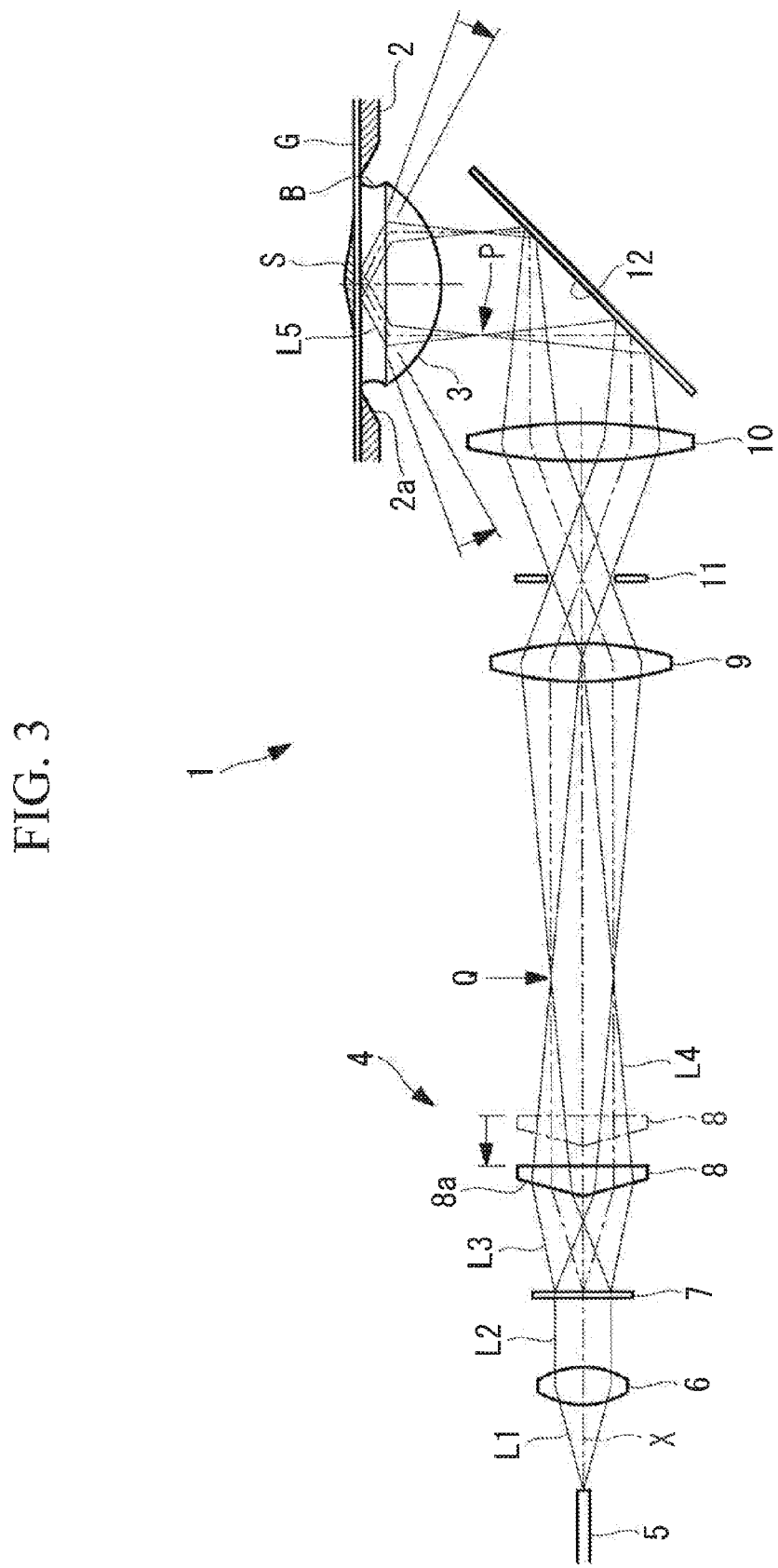

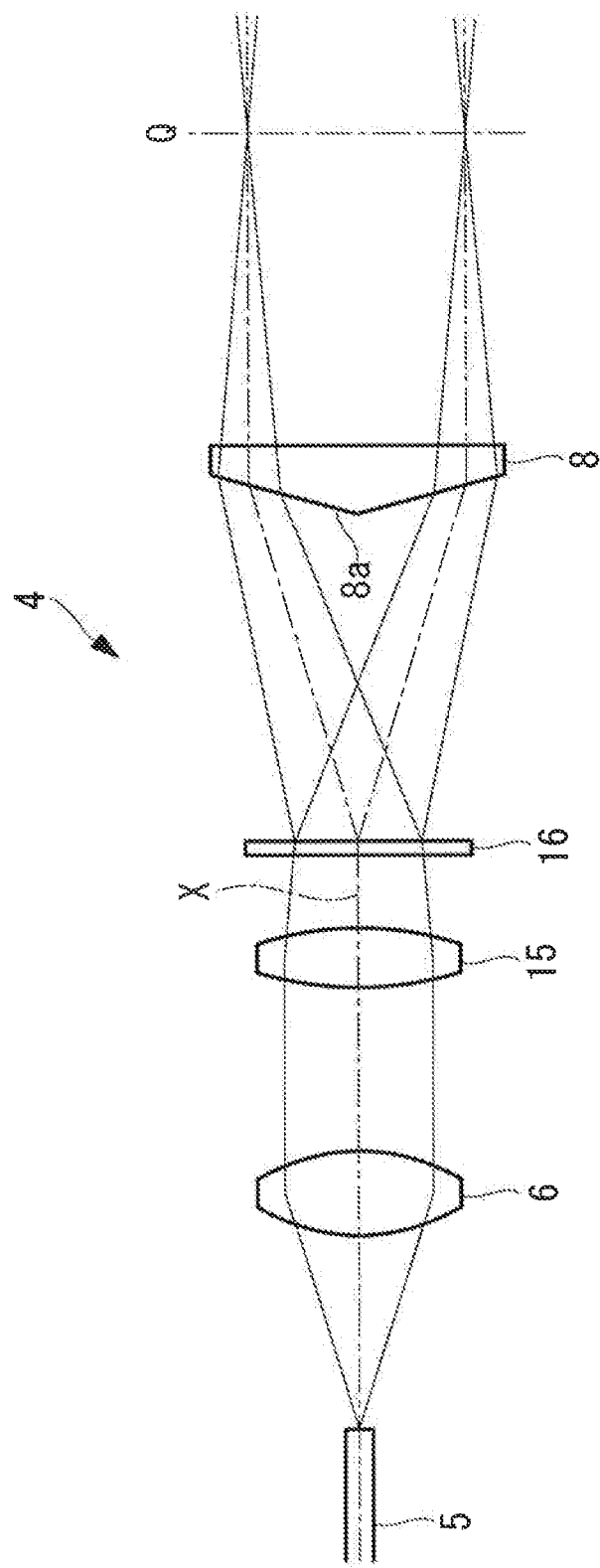

FIG. 9 (a)  FIG. 9 (b)  FIG. 9 (c)  FIG. 9 (d)
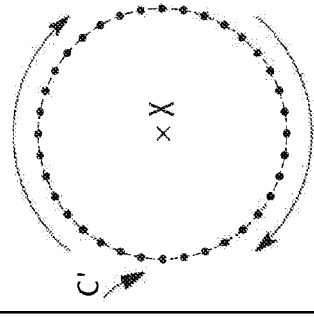
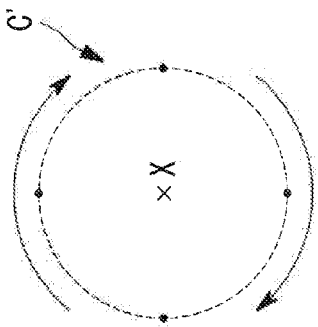
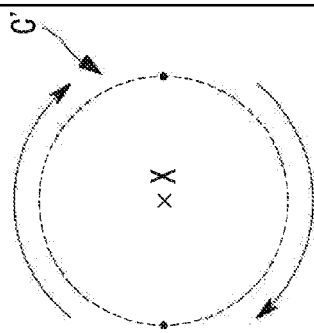
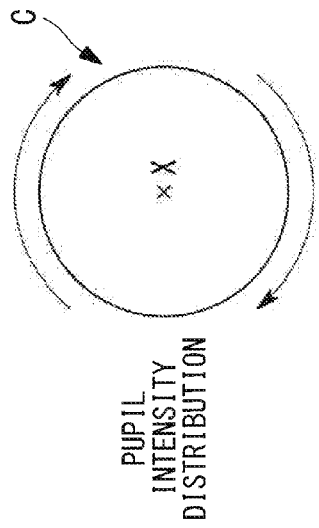
PUPIL INTENSITY DISTRIBUTION
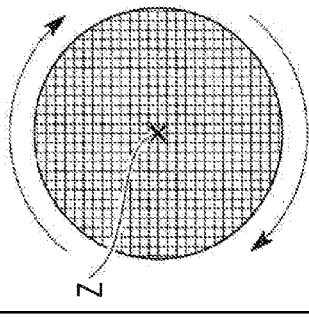
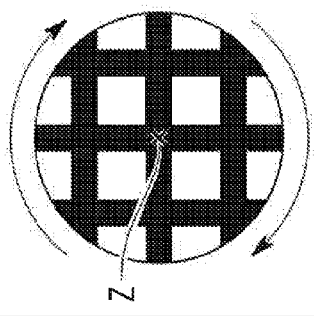
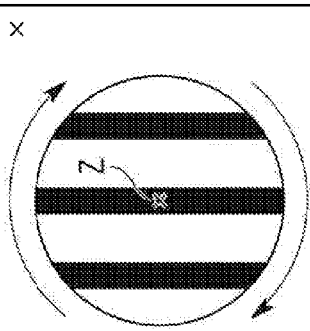
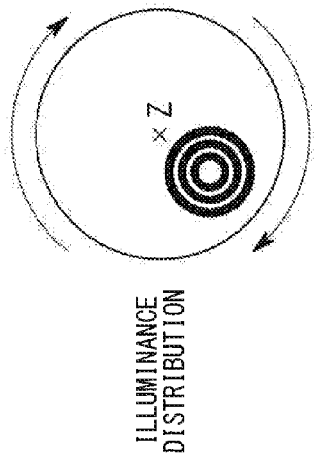
ILLUMINANCE DISTRIBUTION

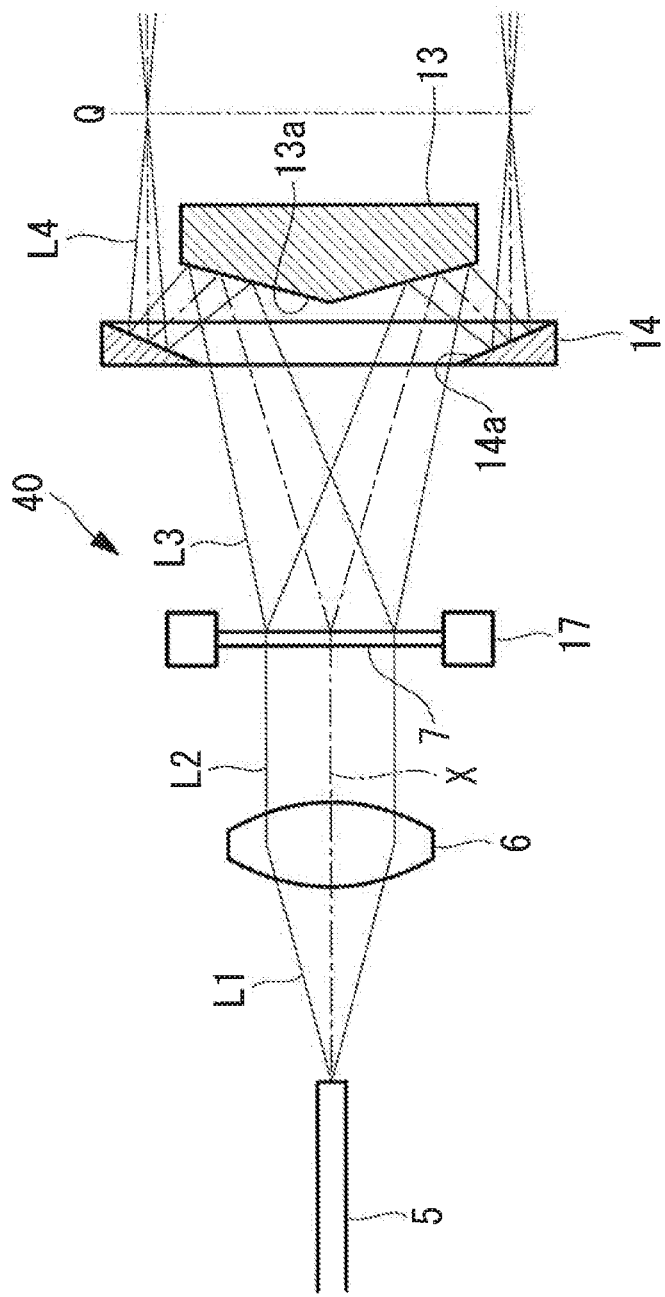

MICROSCOPE ILLUMINATION APPARATUS, MICROSCOPE, AND MICROSCOPE ILLUMINATION METHOD

CROSS-REFERENCE TO RELATED APPLICATIONS

This application claims the benefit of Japanese Patent Application No. 2014-015827, filed on Jan. 30, 2014, and Japanese Patent Application No. 2014-190168, filed on Sep. 18, 2014, the contents of which are incorporated herein by reference.

TECHNICAL FIELD

The present invention relates to a microscope illumination apparatus, a microscope, and a microscope illumination method.

BACKGROUND ART

In the related art, there is a known microscope in which evanescent illumination is used as a technique for observing a specimen in an extremely thin region in the immediate vicinity of the surface of a cover glass (for example, see Patent Literature 1).

Evanescent illumination is an illumination method in which laser light focused at a lens edge portion at a back focal position of a liquid-immersion objective lens is made incident on the liquid-immersion objective lens, and, by totally reflecting the laser light that has been converted to substantially collimated light by the liquid-immersion objective lens at the interface between the cover glass and the liquid, the evanescent light is made to leak out toward the cover glass. Although this is a general microscopy method that allows high-contrast observation of a specimen in an extremely thin region in the immediate vicinity of the surface of the cover glass, there is a problem in that total reflection illumination, with which illumination is provided from one direction, only allows biased fluorescence information to be obtained.

Therefore, there is a method in which shadow formation and speckle noise are suppressed in an image formed based on oblique illumination by acquiring a time-averaged image by rotating the direction in which laser light is made incident on the cover glass about the axis of the liquid-immersion objective lens (for example, see Patent Literature 2).

In the case in which the NA is increased for laser light that is made incident at the back focal position of the liquid-immersion objective lens in order to increase the viewing field area, the energy density of the laser light at this back focal position becomes extremely high, and the liquid-immersion objective lens is damaged by heat. Specifically, when the illumination region is increased by increasing the NA of the laser light, the diameter of a spot formed by the laser light at the back focal position is decreased, and, additionally, that the energy density of the laser light at the back focal position is increased accordingly because, in order to make the brightness of the larger illumination region equivalent to the brightness before increasing the size thereof, laser light to be made incident needs to have correspondingly higher energy. Furthermore, because it is necessary to perform time averaging, high-speed image acquisition is not possible, and thus, the imaging subject shifts due to vibrations of a galvanometer mirror, a motor, or the like.

CITATION LIST

Patent Literature

{PTL 1} Japanese Unexamined Patent Application, Publication No. 2001-272606
{PTL 2} Japanese Unexamined Patent Application, Publication No. 2003-131141

SUMMARY OF INVENTION

A first aspect of the present invention is a microscope illumination apparatus including an optical conversion unit that converts laser light incident thereon from a light source to laser light that has an NA and whose main optical axis is distributed on a conical surface that widens at a predetermined angle with respect to an incident optical axis of the laser light, and from which the laser light is made to exit; and an optical device that has no refractive power and that deflects the laser light, which has exited the optical conversion unit, in a direction parallel to the incident optical axis, wherein the microscope illumination apparatus focuses the laser light that has exited the optical device at a pupil position of a focusing lens for illuminating a specimen or a position that is conjugate with the pupil position.

A second aspect of the present invention is a microscope including a stage on which a specimen is placed; a focusing lens that is disposed so as to face the specimen placed on the stage; and any one of the microscope illumination apparatuses described above that makes the laser light incident on the focusing lens.

A third aspect of the present invention is a microscope illumination method including a first step of converting laser light emitted from a light source to laser light that has an NA has and whose main optical axis is distributed on a conical surface that widens at a predetermined angle with respect to an incident optical axis of the laser light; a second step of deflecting the laser light converted in the first step in a direction parallel to the incident optical axis by using an optical device having no refractive power; a third step of focusing the laser light deflected in the second step at a pupil position of a focusing lens for illuminating a specimen or a position that is conjugate with the pupil position; and a fourth step of moving the optical device in a direction parallel to the incident optical axis of the laser light.

BRIEF DESCRIPTION OF DRAWINGS

FIG. 3 is a schematic diagram showing a change in the shape of a beam when an axicon lens is moved in an optical-axis direction in the microscope in FIG. 1.

FIG. 6 is a schematic diagram showing a microscope illumination apparatus according to another modification of the microscope in FIG. 1.

FIGS. 9(a) to 9(d) are schematic diagrams showing focusing patterns (top row) of laser light taken along arrows A-A in the microscope in FIG. 1, and the speckle noise (bottom row) generated in a region illuminated by laser light at the bottom surface of a cover glass.

FIG. 11B is a schematic diagram showing a microscope illumination apparatus according to a modification of the microscope in FIG. 7.

DESCRIPTION OF EMBODIMENTS

First Embodiment

A microscope illumination apparatus 4, a microscope 1, and a microscope illumination method according to a first embodiment of the present invention will be described below with reference to FIGS. 1 to 6.

Figure 1:
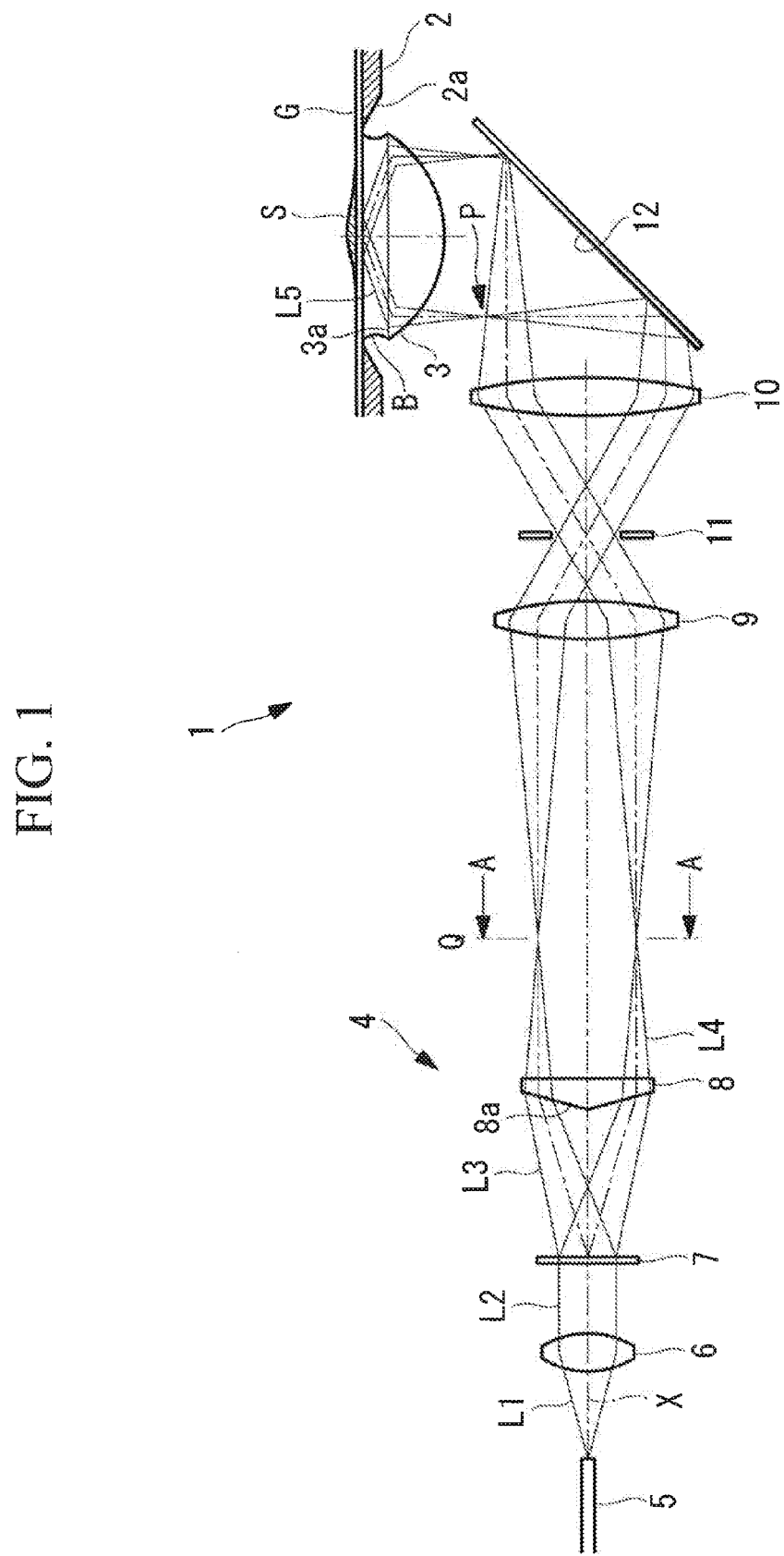
FIG. 1 is a schematic diagram showing the configuration of a microscope according to a first embodiment of the present invention.

As shown in FIG. 1, the microscope 1 according to this embodiment is provided with a stage 2 on which a specimen S is placed, a liquid-immersion objective lens (focusing lens) 3 that is disposed below the stage 2 so as to point upward in the vicinity of the stage 2, and the microscope illumination apparatus 4 that radiates laser light onto the specimen S via the liquid-immersion objective lens 3.

The specimen S is placed on the stage 2 once mounted on a cover glass G. An opening 2a is provided in the stage 2, and the laser light focused by the liquid-immersion objective lens 3 is radiated onto the specimen S from below via the opening 2a and through the cover glass G on the stage 2.

Although the liquid-immersion objective lens 3 is shown in the figures as a single lens, lens 3 is actually formed of a combination of a plurality of lenses. Liquid B, such as purified water or the like, is injected into a gap between the cover glass G and a top surface 3a of a lens at the most distal end of the liquid-immersion objective lens 3 so as to be held in the gap by means of surface tension.

The microscope illumination apparatus 4 according to this embodiment is provided with a collimating lens 6 that collects laser light L1 from a light source that has been guided thereto by an optical fiber 5 and that converts the laser light L1 to laser light L2 constituted of substantially collimated light, a diffraction grating 7 that diffracts the laser light L2 that has been converted to substantially collimated light by the collimating lens 6 when the laser light L2 passes therethrough, and an axicon lens (optical device) 8 that has no refractive power and that deflects laser light L3 that has exited the diffraction grating 7.

In the figures, reference signs 9 and 10 indicate relay lenses that relay a pupil position P of the liquid-immersion objective lens 3, reference sign 11 indicates an aperture, and reference sign 12 indicates a mirror.

As shown in FIG. 1, the diffraction grating 7 is configured so that, when the laser light L2 constituted of substantially collimated light is incident thereon and passes therethrough, the laser light L2 is converted to the laser light L3 that has an NA and that has a main optical axis that is distributed on a conical surface that widens at a predetermined angle with respect to the incident optical axis X of the laser light L2, and thus, the laser light L2 exits in the form of the laser light L3. Specifically, as shown in FIG. 2A, the laser light L3 that has been diffracted by the diffraction grating 7 is focused at the focusing position thereof so as to form a ring-like pattern C that is continuous in the circumferential direction.

Figure 2A:
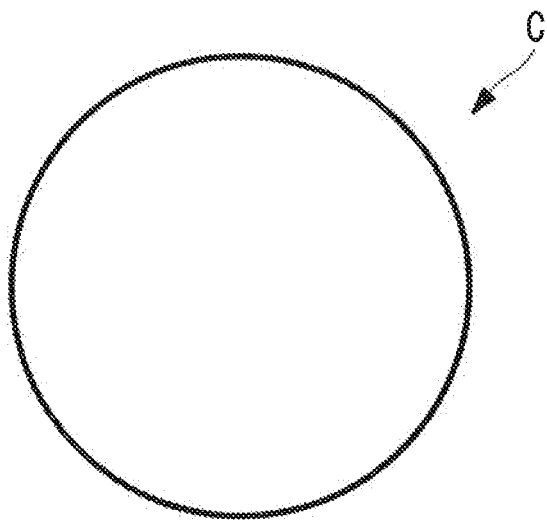
FIG. 2A is a diagram showing an example focusing pattern of laser light, taken along arrows A-A, in the microscope in FIG. 1.
Figure 2B:
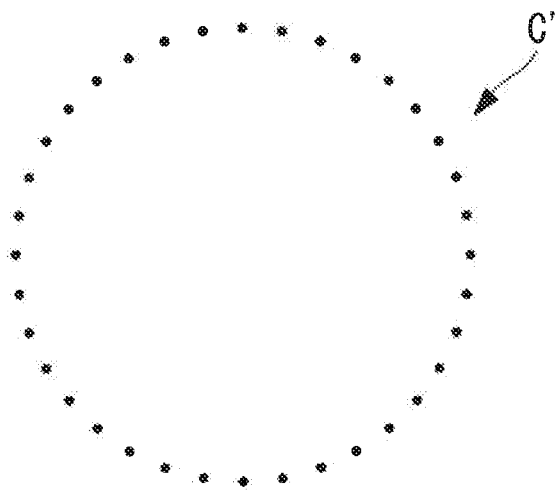
FIG. 2B is a diagram showing another example focusing pattern of the laser light, taken along the arrows A-A, in the microscope in FIG. 1.

Note that, in this embodiment, as shown in FIG. 2A, the diffraction grating 7 converts the laser light L2 to the laser light L3 that is focused so as to form the pattern C, which is continuous in the circumferential direction; however, the laser light L3 is not necessarily required to be continuous in the circumferential direction, and the laser light L2 may be converted to laser light L3 that is focused at many positions with gaps therebetween in the circumferential direction so as to form a pattern C', as shown in FIG. 2B. The number of spots may be any number equal to or greater than two, and having a greater number of spots achieves greater effectiveness.

The axicon lens 8 has a tapered surface 8a on an incident side thereof. The inclination angle of the tapered surface 8a is set at the angle by which the main optical axis of the laser light L3 that has exited the diffraction grating 7 is deflected to a direction parallel to the incident optical axis X of the diffraction grating 7. Because the axicon lens 8 has no refractive power, the NAs of laser light L3 and L4 do not change before and after passing through the axicon lens 8.

The diffraction grating 7 and the axicon lens 8 are disposed so that the focusing position of the laser light L4 that has exited the axicon lens 8 coincides with a back focal position Q of the rear-side lens 9 that constitutes the relay lenses 9 and 10. Specifically, the laser light L4 that has exited the axicon lens 8 is focused at a position Q that is optically conjugate with a pupil position P of the liquid-immersion objective lens 3.

The axicon lens 8 is provided so as to be movable in a direction parallel to the incident optical axis X of the laser light L2 which leads to the diffraction grating 7. As shown in FIG. 3, when the axicon lens 8 is moved in this direction, the position at which the laser light L3 that has exited the diffraction grating 7 is incident on the tapered surface 8a of the axicon lens 8 is changed in a radial direction, and, as a result, the diameter of the pattern formed by the laser light L4 at the focusing position thereof is changed. In the example shown in FIG. 3, by moving the axicon lens 8 closer to the diffraction grating 7, the diameter of the circular pattern formed at the position Q at which the laser light L4 is focused is decreased.

A microscope illumination method employing the thus-configured microscope illumination apparatus 4 and microscope 1 according to this embodiment will be described below.

In order to observe a specimen S by using the microscope 1 according to this embodiment, the specimen S mounted on the cover glass G is placed on the stage 2, and the laser light L1 from a light source is made to exit from the exit end of the optical fiber 5.

Figure 4:
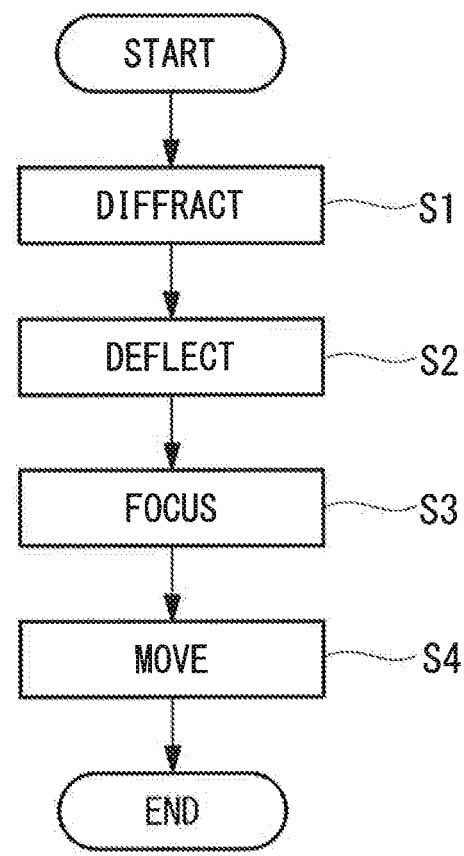
FIG. 4 is a flowchart for explaining a microscope illumination method according to the first embodiment of the present invention.

As shown in FIG. 4, the microscope illumination method according to this embodiment includes a first step S1 of converting, by means of the diffraction grating 7, the laser light L2, which has exited the exit end of the optical fiber 5 and which has been converted to substantially collimated light by the collimating lens 6, to the laser light L3 that has an NA and whose main optical axis is distributed on the conical surface that widens centered on the incident optical axis X; a second step S2 of deflecting the laser light L3 converted in the first step S1 in the direction parallel to the incident optical axis X by means of the axicon lens 8 that has no refractive power; a third step S3 of focusing the laser light L4 deflected in the second step S2 at the position Q that is conjugate with the pupil position P of the liquid-immersion objective lens 3; and a fourth step S4 of moving the axicon lens 8 in the direction parallel to the incident optical axis X.

The laser light L1 that has exited the exit end of the optical fiber 5 is made incident on the diffraction grating 7 in the first step S1 after being converted by the collimating lens 6 to the laser light L2 constituted of substantially collimated light. By being diffracted by the diffraction grating 7, the laser light L2 is converted to the laser light L3 that has a ring-like pattern having the main optical axis that extends on the conical surface centered on the incident optical axis X and that is focused with a predetermined NA. Subsequently, by passing through the axicon lens 8 in the second step S2, the main optical axis of the laser light L3 is deflected in the direction parallel to the incident optical axis X, and the laser light L3 is converted to laser light L4 that has a ring-like pattern having the main optical axis that extends on a cylindrical surface centered on the incident optical axis X, and the laser light L4 is focused at the back focal position Q of the relay lens 9 in the third step S3.

The focused laser light L4 is relayed by the relay lenses 9 and 10, is deflected 90° by the mirror 12, and is focused at the pupil position P which is the back focal position of the liquid-immersion objective lens 3. By doing so, laser light L5 focused by the liquid-immersion objective lens 3 propagates through the liquid B in the form of collimated light and is incident on the bottom surface of the cover glass G at an angle from all circumferential directions of the liquid-immersion objective lens 3. In the case in which the incident angle of the laser light L5 exceeds the critical angle, thus forming a shallow angle, the laser light L5 is totally reflected at the interface between the cover glass G and the liquid B, and evanescent light passes through the cover glass G, thus illuminating an extremely thin region in the vicinity of an adhesion surface at which the specimen S is adhered to the top surface of the cover glass G.

As a result of the evanescent light irradiation, fluorescence generated in the vicinity of the adhesion surface of the specimen S is collected by the liquid-immersion objective lens 3, the collected fluorescence is separated from the laser light L5 by a dichroic mirror (not shown) and acquired, and thus, it is possible to obtain a fluorescence image. The dichroic mirror is disposed, for example, closer to the specimen than to the axicon lens 8.

In this case, with the microscope illumination apparatus 4 according to this embodiment, because the laser light L4 is dispersed by the diffraction grating 7 in an annular shape, the laser light L4 is not concentrated at one point at the pupil position P of the liquid-immersion objective lens 3, but it is dispersed over the entire circumference thereof.

By doing so, even if the spot diameter at the pupil position P of the liquid-immersion objective lens 3 is decreased by increasing the NA of the laser light L4 that is made incident at the pupil position P in order to increase the viewing field area, and, in addition, even if the energy of the laser light L1 is increased in order to maintain the brightness of the larger illumination region, the energy density of the laser light L4 at the pupil position P is prevented from becoming excessively high, and thus, there is an advantage in that it is possible to prevent heat damage to the liquid-immersion objective lens 3.

In addition, with the microscope illumination apparatus 4 and the microscope 1 according to this embodiment, by continuously moving the axicon lens 8 in the optical-axis direction thereof in the fourth step S4, it is possible to continuously change the diameter of the pattern formed by the laser light L4 focused at the back focal position Q of the relay lens 9. Consequently, as shown in FIG. 3, it is possible to continuously change the inclination angle of the laser light L5 that exits the liquid-immersion objective lens 3 toward the specimen S. By changing the inclination angle, it is possible to continuously adjust the amount of evanescent light that leaks out toward the specimen S.

In this case, with the microscope illumination apparatus 4 according to this embodiment, because the axicon lens 8 has no refractive power, there is an advantage in that, even if the axicon lens 8 is moved in the optical-axis direction, the focusing position of the laser light L4 that passes therethrough does not change in the optical-axis direction, and the NA of the laser light L4 also does not change.

Specifically, because the focusing position does not change, even if the axicon lens 8 is moved in the optical-axis direction in order to adjust the amount of evanescent-light leakage, it is possible to maintain Koehler illumination by continuing to precisely focus the laser light L4 at the pupil position P of the liquid-immersion objective lens 3. In addition, because NA does not change, there is an advantage in that it is possible to maintain the size and brightness of an illumination region even if the amount of evanescent-light leakage is adjusted.

Figure 5A:
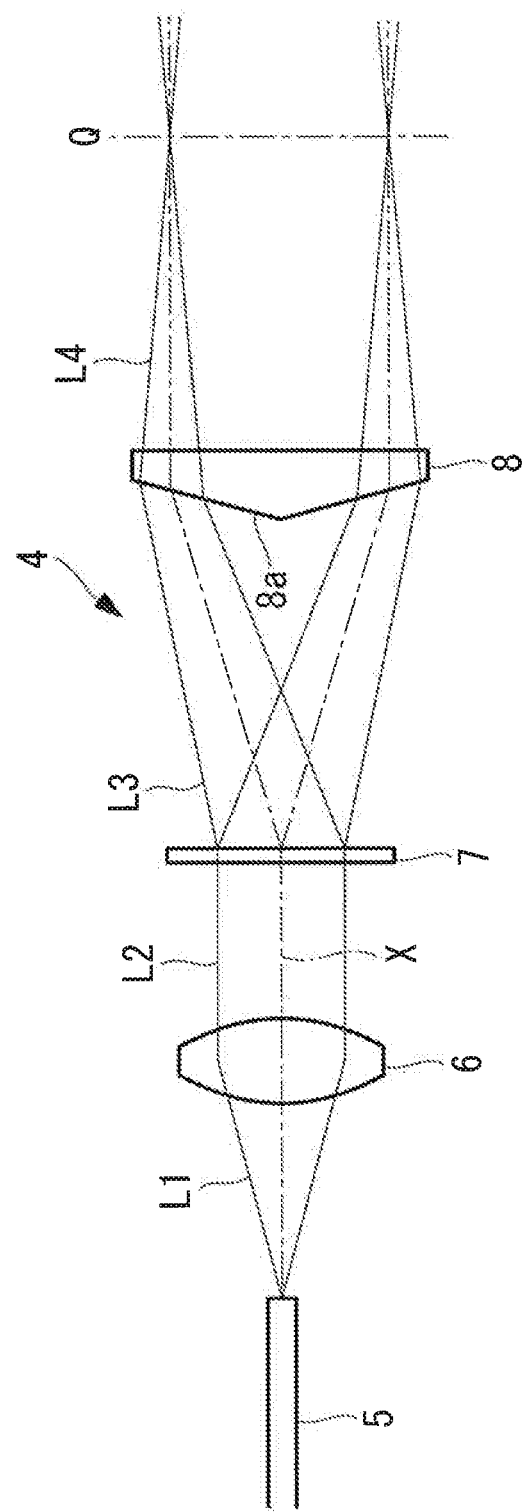
FIG. 5A is a schematic diagram showing a microscope illumination apparatus according to this embodiment of the microscope in FIG. 1.
Figure 5B:
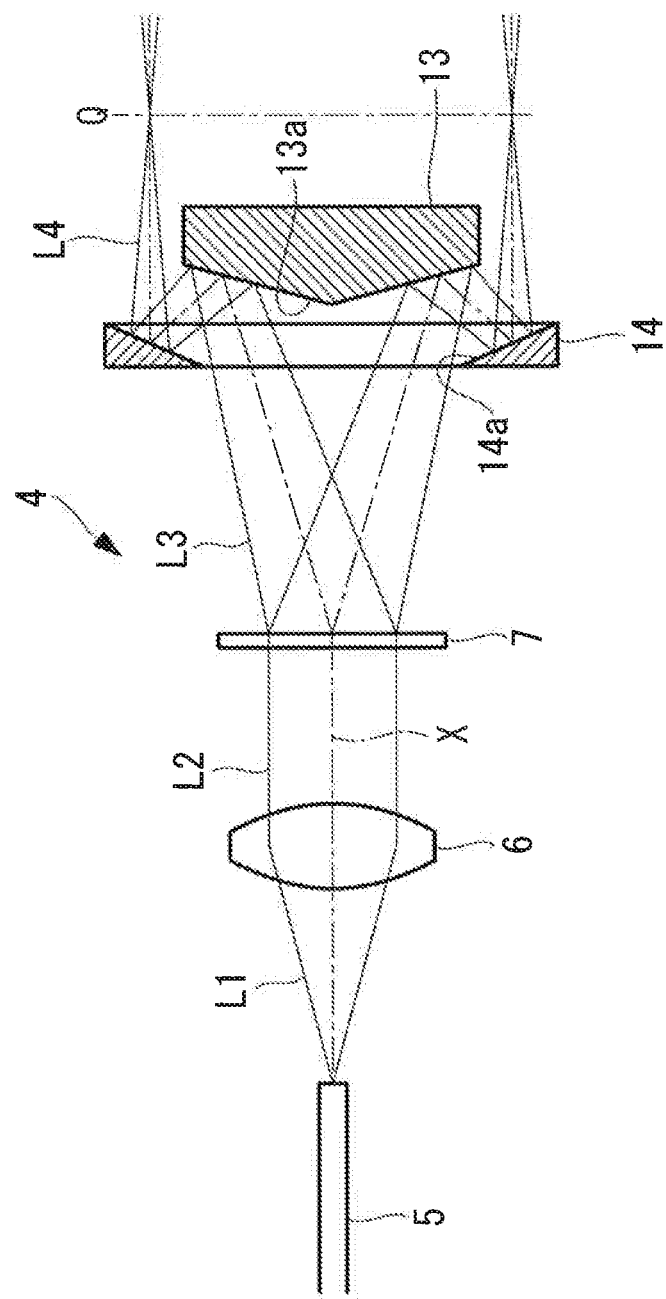
FIG. 5B is a schematic diagram showing a microscope illumination apparatus according to a modification of the microscope in FIG. 1.

In this embodiment, as shown in FIG. 5A, the axicon lens 8 with which the laser light L3 is deflected when passing therethrough has been described as an example of the optical device for deflecting the laser light L3 that has passed through the diffraction grating 7; however, the specific configuration of the optical device is not limited thereto, and, as shown in FIG. 5B, it is permissible to employ, as the optical device, mirrors 13 and 14 that deflect laser light by reflecting it by combining a reflection surface 13a formed as a tapered surface and a reflection surface 14a formed as a tapered inner surface.

In this embodiment, at the diffraction grating 7, the laser light L2 is converted to the laser light L3 that has an NA and that has a main optical axis on a conical surface that gradually widens; alternatively, however, as shown in FIG. 6, it is permissible to provide a focusing lens 15 that gives an NA to the laser light L2 that has been converted to substantially collimated light by the collimating lens 6, and it is permissible to employ a diffraction grating 16 that has no refractive power and that converts the laser light that has an NA and that has exited the focusing lens 15 to light having a main optical axis on a conical surface so as to be parallel thereto. By doing so, it is possible to configure the diffraction grating 16 in a simple manner by simplifying the function thereof. In the case in which collimated light is made incident on the diffraction grating 16, it is also permissible to provide, at a stage subsequent to the diffraction grating 16, a lens that gives an NA to the laser light exiting the diffraction grating 16.

In this embodiment, although the microscope illumination apparatus 4 that performs total reflection illumination, in which the laser light L5 is totally reflected at the interface between the liquid B and the cover glass G, has been described as an example, alternatively, the present invention may be applied to a microscope illumination apparatus with which laser light L5 that is radiated obliquely from a direction that is inclined with respect to the optical axis by using a condenser lens is allowed to pass therethrough without total reflection thereof, and that performs dark-field illumination with which fluorescence is observed at a position on the optical axis to which the transmitted light is not made incident.

In this embodiment, speckle noise contained in laser light radiated onto the specimen S may be decreased by placing a laser speckle reducer (random phase modulation device: not shown) at a position Q that is optically conjugate with the pupil position P of the liquid-immersion objective lens 3, which is the focusing position of the laser light L4 that has exited the axicon lens 8 in FIG. 1.

Second Embodiment

Next, a microscope illumination apparatus 40, a microscope 100, and a microscope illumination method according to a second embodiment of the present invention will be described below with reference to FIGS. 7 to 12.

The microscope illumination apparatus 40 according to this embodiment differs from that in the first embodiment in that it is additionally provided with a rotating mechanism 17 that rotates the diffraction grating 7 about a rotation axis Y that is parallel to the incident optical axis X of the laser light L2. Therefore, in this embodiment, the rotating mechanism 17 will mainly be described, and configurations that are the same as those in the first embodiment will be assigned the same reference signs and descriptions thereof will be omitted.

Figure 7:
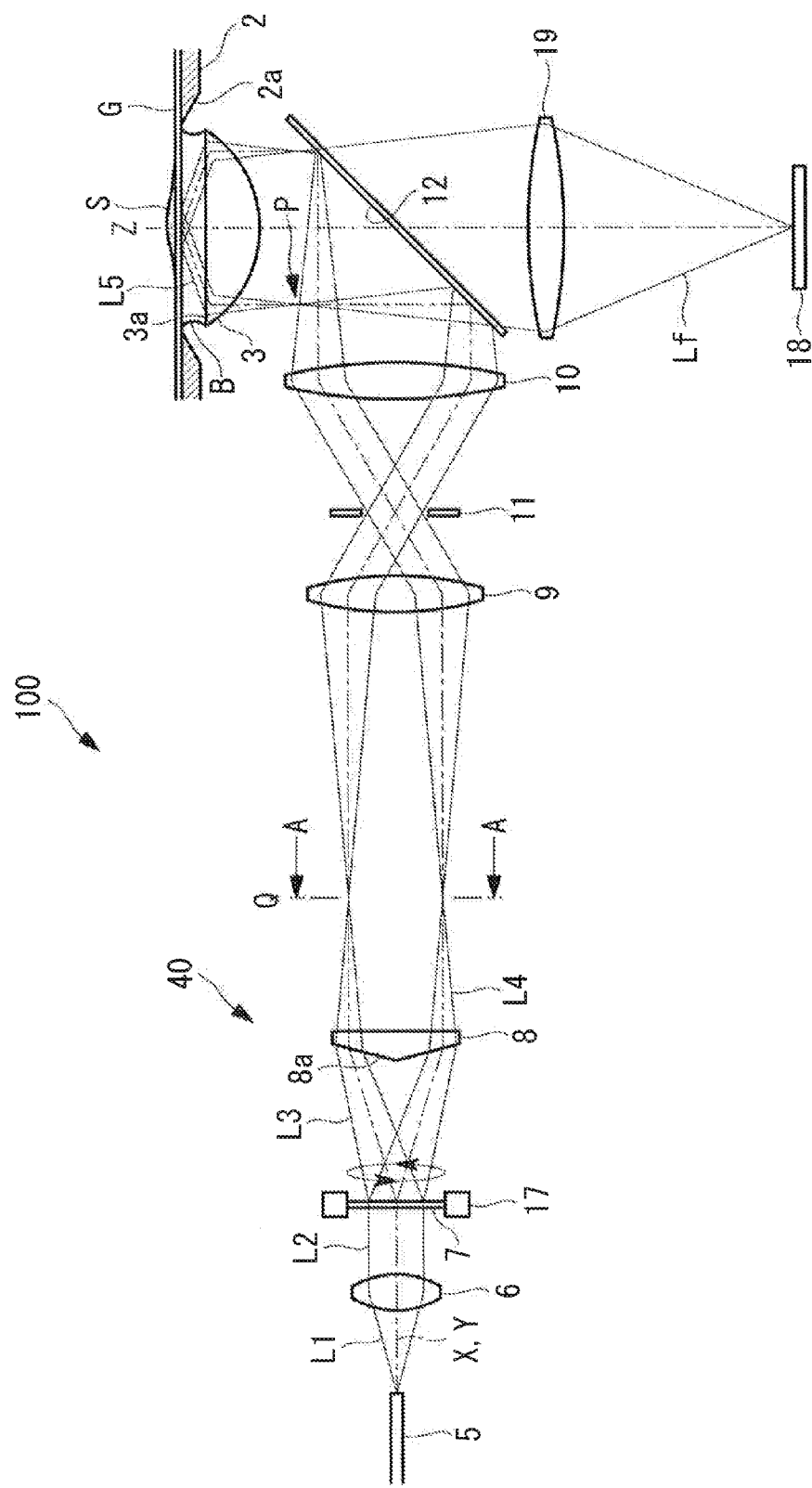
FIG. 7 is a schematic diagram showing the configuration of a microscope according to a second embodiment of the present invention.

In FIG. 7, although the rotation axis Y is aligned with the incident optical axis X, as will be described later, the rotation axis Y may be decentered with respect to the incident optical axis X. The rotating mechanism 17 is, for example, a hollow motor. The hollow motor is attached outside the diffraction grating 7 and supports the outer circumferential surface of the diffraction grating 7 so that the diffraction grating 7 is rotatable about the rotation axis Y. Alternatively, the rotating mechanism 17 may be configured by a combination of a motor and a gear that transmits the rotational force output from the motor to the diffraction grating 7.

When the diffraction grating 7 is rotated by the rotating mechanism 17, the main optical axis of the laser light L3 that exits the diffraction grating 7 is rotated about an extended axis of the incident optical axis X along a conical surface whose apex is located on the incident optical axis X and that is symmetrical with respect to the extended axis of the incident optical axis X, and the main optical axis of the laser light L4 that has exited the axicon lens 8 is also rotated about the extended axis along a cylindrical surface centered on the extended axis of the incident optical axis X. As a result, as will be described later, the laser light L5 that exits the liquid-immersion objective lens 3 toward the cover glass G and that is distributed on the conical surface is rotated about an optical axis Z of the liquid-immersion objective lens 3 along the conical surface.

The speed at which the diffraction grating 7 is rotated by the rotating mechanism 17 is determined in accordance with the exposure time T (s) of the image-acquisition device 18, and is set at a high speed equal to or greater than 1/T rotation per second (1/T rps). For example, in the case in which the exposure time T of the image-acquisition device 18 is 1/60 s (frame rate is 60 fpm), the rotational speed of the diffraction grating 7 is set to be equal to or greater than 60 rps.

Furthermore, in the case in which observation subject is a high-speed phenomenon, such as a biological reaction, it is preferable that the rotational speed of the diffraction grating 7 be equal to or greater than 10000 rpm. The speed of a biological reaction is several milliseconds in the case of fast ones. In order to observe such a biological reaction, it is necessary to decrease the exposure time T of the image-acquisition device 18 to the same level as the speed of the biological reaction, and it is also necessary to increase the rotational speed of the diffraction grating 7 along with a decrease in the exposure time T of the image-acquisition device 18. For example, in the case in which the exposure time T of the image-acquisition device 18 is set to ten milliseconds to observe a biological reaction at a scale of several milliseconds, the rotational speed of the diffraction grating 7 is set to 10000 rpm.

A microscope illumination method employing the thus-configured microscope illumination apparatus 40 and microscope 100 according to this embodiment will be described below.

Figure 8:
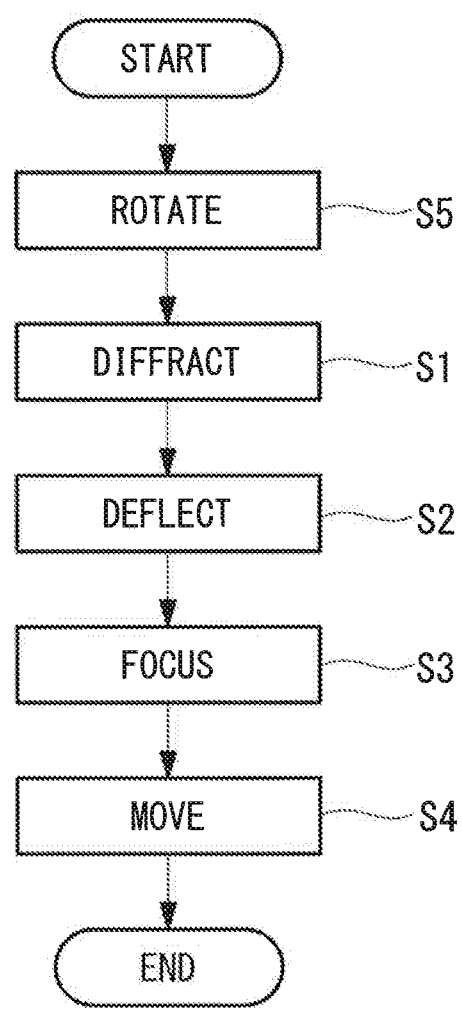
FIG. 8 is a flowchart for explaining a microscope illumination method according to the second embodiment of the present invention.

As shown in FIG. 8, the microscope illumination method according to this embodiment includes, in addition to Steps S1 to S4, a fifth step S5 of rotating the laser light L4, which is focused at the position Q, about the extended axis of the incident optical axis X at a high speed by means of the rotation of the diffraction grating 7.

Steps S1 to S4 are the same as those in the first embodiment.

By performing the above-described Steps S1 to S3 while rotating the diffraction grating 7 at a high speed in the fifth step S5, in Step S3, the laser light L4 is focused at the position Q while being rotated about the extended axis of the incident optical axis X. By doing so, the laser light L5 is incident on the cover glass G at an angle from the liquid-immersion objective lens 3 while being rotated about the optical axis Z of the liquid-immersion objective lens 3.

As a result of the evanescent light irradiation, fluorescence (observation light) Lf generated in the vicinity of the adhesion surface of the specimen S is collected by the liquid-immersion objective lens 3. In this embodiment, the mirror 12 is a dichroic mirror that reflects the laser light L4 and L5, and allows the fluorescence Lf to pass therethrough. The fluorescence Lf collected by the liquid-immersion objective lens 3 is separated from the laser light L5 by the mirror 12 and is focused by a lens 19 at an image-acquisition surface of the image-acquisition device 18; thus, it is possible to obtain a fluorescence image by acquiring an image of the fluorescence Lf with the image-acquisition device 18.

The above-described microscope illumination apparatus 40 and microscope 100 according to this embodiment afford the following advantages in addition to the advantages of the first embodiment.

By illuminating the specimen S by the laser light L5 and by acquiring an image of the fluorescence Lf by using the image-acquisition device 18, while rotating the diffraction grating 7 at a high speed by means of the rotating mechanism 17, there is an advantage in that the specimen S can be illuminated without generating speckle noise, and a fluorescence image that does not contain speckle noise can be acquired by using the image-acquisition device 18.

Specifically, as shown in FIG. 9(a), the laser light L5 sometimes contains localized interference patterns caused by smudges on lens surfaces that the rays of the laser light L1 to L4 pass through. Furthermore, as shown in FIG. 2B, in the case in which the rays of the laser light L3 to L5 have the pattern C' in which laser light is focused at a plurality of positions with gaps therebetween in the circumferential direction, as shown in FIGS. 9(b), 9(c), and 9(d), in the illumination region at the bottom surface of the cover glass G, the rays of the laser light L5 that are simultaneously incident thereon at an angle from a plurality of directions interfere with each other, thus generating interference stripes in accordance with the respective patterns C'. Speckle noise, such as that shown in the bottom rows of FIGS. 9(a) to 9(d), also causes unevenness in the intensity of the evanescent light and the fluorescence Lf, and, as a result, speckle noise remains in a fluorescence image formed by the liquid-immersion objective lens 3.

In FIGS. 9(a) to 9(d), the top rows show the focusing patterns C and C' of the laser light L3 and L4 at the pupil position P or the position Q that is conjugate with the position P, and the bottom rows show illuminance distributions of the laser light L5 at the bottom surface of the cover glass G. The top rows of FIGS. 9(b), 9(c), and 9(d) show patterns C' in which the laser light L3 is divided into two, four, and thirty six parts and is focused at two, four, and thirty six positions, respectively.

In this embodiment, speckle noise formed in the illumination region at the bottom surface of the cover glass G is also rotated about the optical axis Z at least once in association with the rotation of the laser light L5 about the optical axis Z during the exposure time T of the image-acquisition device 18. By doing so, in the illumination region, an uneven illuminance distribution of the laser light L5 caused by speckle noise is time averaged, thus being decreased to a level that cannot be visually recognized, and, regarding the evanescent light and the fluorescence Lf excited by this evanescent light, contrasts thereof that are caused by speckle noise are also time averaged. Because the image-acquisition device 18 acquires a fluorescence image from which speckle noise has effectively been removed in this way, it is possible to acquire a fluorescence image that does not contain speckle noise and that is equivalent to an image acquired when the fluorescence Lf is excited by using laser light having an even illuminance distribution.

In addition, because the diffraction grating 7 is a small discoid member having a diameter of about 10 mm or less, even at a high rotational speed of about 12000 rpm, it is possible to achieve stable rotation by using a low-cost, simple rotating mechanism 17.

Furthermore, because a system in which the diffraction grating 7 is rotated is employed as the rotating mechanism 17 that rotates the laser light L3, it is possible to accurately rotate the laser light L3 about the extended axis of the incident optical axis X without requiring a special configuration or control therefor.

Figure 10A:
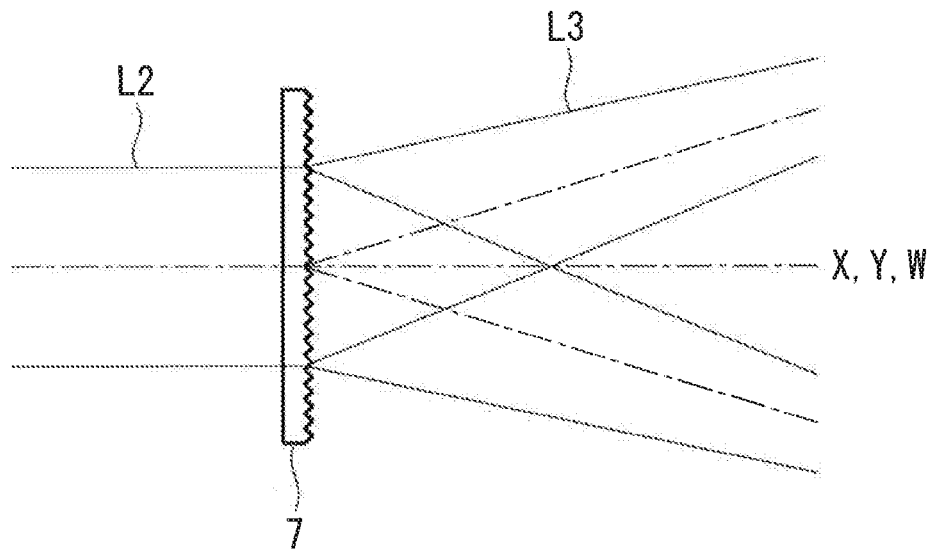
FIG. 10A is a schematic diagram for explaining a relationship between the position of a diffraction grating and laser light that exits this diffraction grating, in the microscope in FIG. 7.
Figure 10B:
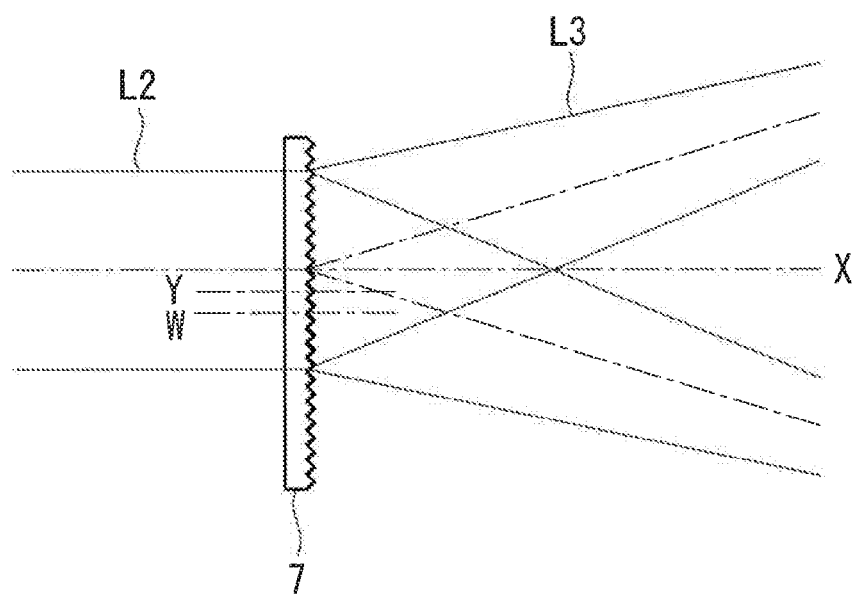
FIG. 10B is a schematic diagram for explaining another relationship between the position of the diffraction grating and the laser light that exits this diffraction grating, in the microscope in FIG. 7.

Specifically, as shown in FIGS. 10A and 10B, the laser light L3 that has exited the diffraction grating 7 is controlled only by the angle, about the rotation axis Y, of the grating formed at the diffraction surface of the diffraction grating 7, and translational movement of the diffraction grating 7 in the direction that intersects the incident optical axis X does not affect the laser light L3 in any way. Therefore, as shown in FIG. 10B, three axes, namely, the incident optical axis X, the rotation axis Y of the diffraction grating 7 based on the rotating mechanism 17, and a center axis W of the diffraction grating 7, do not necessarily need to be aligned with each other, and it suffices that the diffraction grating 7 be placed at a position at which the laser light L2 is incident regardless of the rotational angle. By doing so, highly precise alignment of the diffraction grating 7 is not necessary, and, even if the position of the diffraction grating 7 shifts in association with mechanical rotation or the like, this positional shift can be tolerated.

Although the rotating mechanism 17 that rotates the laser light L3 by rotating the diffraction grating 7 has been described in this embodiment, the configuration of the rotating mechanism 17 is not limited thereto, and it is permissible to employ a configuration in which the laser light L3 or L4 is rotated by other optical devices, for example, an image-rotating prism or two galvanometer mirrors. However, in the case in which an image-rotating prism and a galvanometer mirror are employed, highly precise alignment and control are required.

In the case in which the laser light L4 is rotated, for example, by means of rotation of an image-rotating prism (not shown) that is disposed between the axicon lens 8 and the relay lens 9, three axes, namely, a center axis of the image-rotating prism itself, a rotation axis of the image-rotating prism, and the extended axis of the incident optical axis X, must accurately be aligned with each other. Furthermore, because the image-rotating prism is a relatively large member, positional shifts tend to occur at a scale of several micrometers in association with the rotation of the prism. Therefore, highly precise alignment of the image-rotating prism and highly advanced control for compensating for positional shifts of the image-rotating prism are required.

Also in the case in which, by using two galvanometer mirrors, the laser light L4 is rotated by scanning the laser light L4 in the direction in which the rays of the laser light L4 perpendicularly intersect with each other, reflection optical axes of the galvanometer mirrors and the extended axis of the incident optical axis X must accurately be aligned with each other. Furthermore, in order to rotate the laser light L4, the two galvanometer mirrors must be driven while accurately synchronizing them. If the vibration phases and amplitudes of the two galvanometer mirrors deviate from ideal values even slightly, the rotation track of the laser light L4 would form an elliptic cylindrical surface instead of a true-circular cylindrical surface. Therefore, highly advanced control of the galvanometer mirrors is required.

In this embodiment also, the same modifications as the modifications described in the first embodiment may be employed.

Figure 11A:
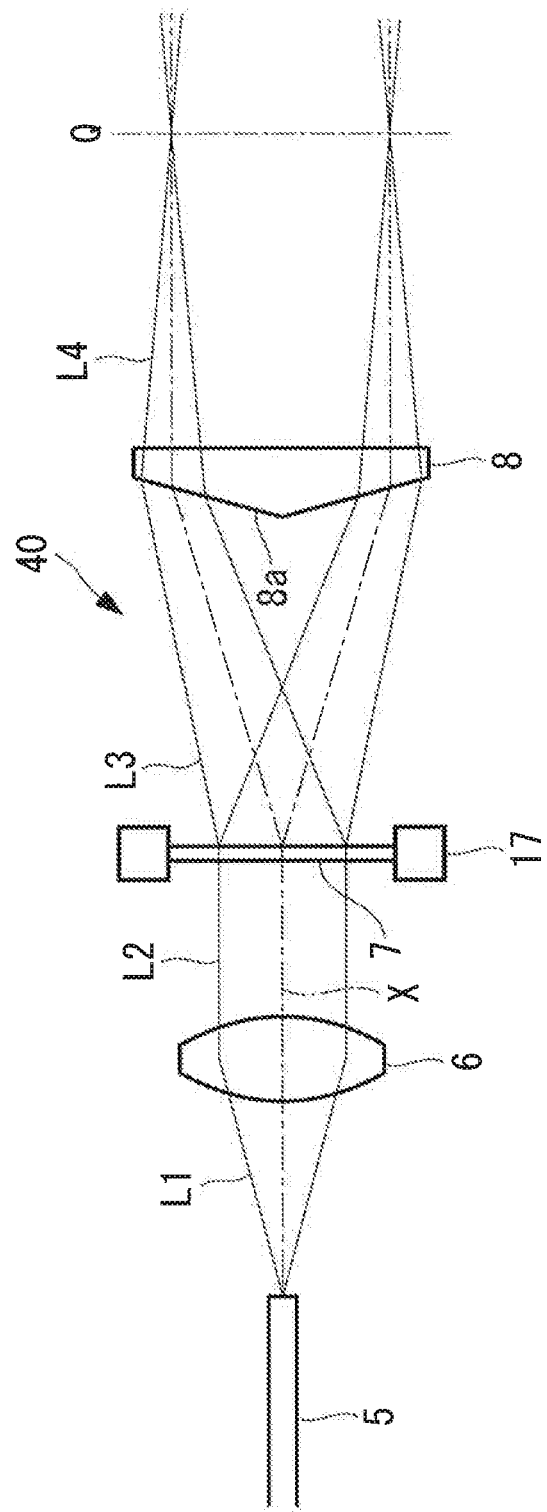
FIG. 11A is a schematic diagram showing a microscope illumination apparatus according to this embodiment of the microscope in FIG. 7.

Specifically, as shown in FIG. 11B, by employing mirrors 13 and 14 that are the same as the mirrors 13 and 14 in FIG. 5B instead of the axicon lens 8 shown in FIG. 11A, laser light may be deflected by reflecting it using a combination of a reflection surface 13a formed as a tapered surface and a reflection surface 14a formed as a tapered inner surface.

Figure 12:
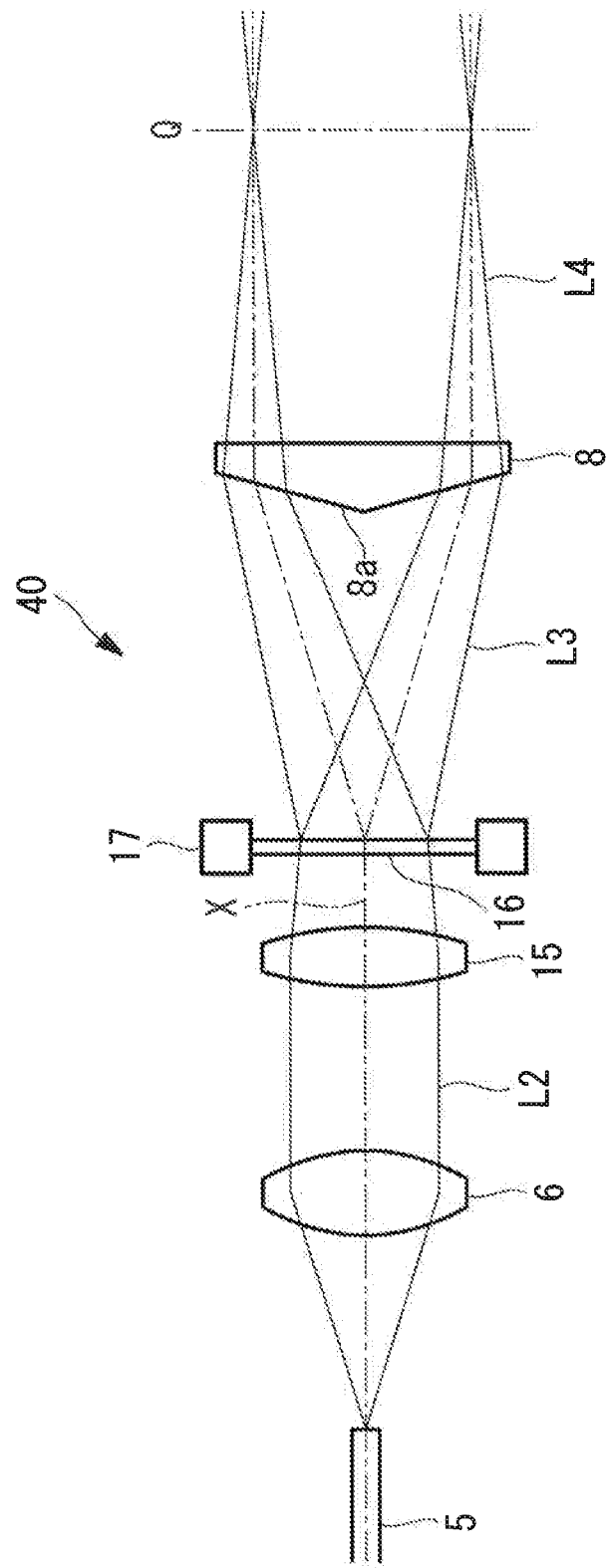
FIG. 12 is a schematic diagram showing a microscope illumination apparatus according to another modification of the microscope in FIG. 7.

In addition, as shown in FIG. 12, by providing a focusing lens 15 that is the same as the focusing lens 15 in FIG. 6, which gives an NA to the laser light L2, a diffraction grating 16 having no refractive power may be employed.

In addition, the microscope illumination apparatus 40 may employ dark-field illumination instead of total reflection illumination.

In addition, speckle noise contained in laser light radiated onto the specimen S may be decreased by placing a laser speckle reducer (random phase modulation device: not shown) at a position Q that is optically conjugate with the pupil position P of the liquid-immersion objective lens 3.

From the above-described embodiments, the following inventions are derived.

One aspect of the present invention is a microscope illumination apparatus including an optical conversion unit that converts laser light incident thereon from a light source to laser light that has an NA and whose main optical axis is distributed on a conical surface that widens at a predetermined angle with respect to an incident optical axis of the laser light, and from which the laser light is made to exit; and an optical device that has no refractive power and that deflects the laser light, which has exited the optical conversion unit, in a direction parallel to the incident optical axis, wherein the microscope illumination apparatus focuses the laser light that has exited the optical device at a pupil position of a focusing lens for illuminating a specimen or a position that is conjugate with the pupil position.

With the aspect of the present invention, once the laser light from the light source is incident on the optical conversion unit, the laser light is converted in the optical conversion unit to the laser light that has a main optical axis that is distributed on the conical surface and that has an NA so as to be focused along the main optical axis. The laser light that has exited the optical conversion unit is deflected by passing through the optical device, thus being converted to the laser light that has an NA and that has a main optical axis distributed on the cylindrical surface that is parallel to the incident optical axis.

Then, because such laser light is focused at the pupil position of the focusing lens or the position that is conjugate with the pupil position, the laser light focused by the focusing lens illuminates the specimen by means of Koehler illumination. In this case, because the laser light that is incident on the focusing lens has the main optical axis thereof distributed in the circumferential direction centered on the optical axis of the focusing lens, the specimen is illuminated by making the laser light simultaneously incident at an angle from a plurality of directions in the circumferential direction.

Therefore, problems associated with oblique illumination are eliminated, and, also, because the focusing positions of the laser light at the pupil position of the focusing lens are dispersed, even if the NA of the laser light is increased and high-energy laser light is introduced, the energy density at the focusing positions does not become excessively high, and thus, it is possible to maintain the focusing lens in a sound condition. Furthermore, high-speed image acquisition is possible because time averaging is not necessary, and blurring of an imaging subject does not occur because a vibration source is not included.

In addition, because the optical device has no refractive power, the NA of the laser light is maintained without change before and after passing through the optical device. Specifically, depending on which intermediate positions on the optical axis that spreads at the predetermined angle with respect to the incident optical axis the optical device is placed, the diameter of the cylindrical surface, on which the main optical axis of the laser light that exits the optical device is placed, changes, and thus, it is possible to continuously change the angle of Koehler illumination that is made incident on the specimen by the focusing lens, and it is possible to provide an illumination state that is optimal for the objective lens, the specimen, and the observation conditions. Also, because the NA of the laser light does not change in this case also, it is possible to keep the beam diameter for Koehler illumination constant and to keep the brightness in an illumination region constant.

In the above-described aspect, the optical conversion unit may be a diffraction grating that deflects laser light and that gives an NA thereto.

By doing so, by using a single diffraction grating, the energy density of the laser light at the pupil position of the focusing lens can be dispersed in a simple manner, and the viewing field area can be increased while preventing damage to the focusing lens for performing Koehler illumination.

In the above-described aspect, the optical conversion unit may be provided with a lens that has positive refractive power for giving an NA to laser light and a diffraction grating that deflects the laser light.

By doing so, it is possible to simplify the diffraction grating by simplifying the function thereof. The laser light may be deflected by the diffraction grating after the lens has given an NA thereto, or vice versa.

In the above-described aspect, the optical conversion unit may convert the laser light to laser light that is continuously distributed over the entire circumference of the conical surface.

By doing so, it is possible to make the energy density of the laser light focused at the pupil position of the focusing lens lowest, and thus, it is possible to ensure a large, bright viewing field area.

In the above-described aspect, the optical device may be provided so as to be movable in a direction parallel to the incident optical axis of the laser light.

By doing so, it is possible to continuously adjust the angle at which Koehler illumination is made incident on the specimen by the focusing lens by changing the position at which the laser light is made incident at the pupil position of the focusing lens in the radial direction. In this case, the brightness of the illumination region can be kept constant even if the incident angle is changed.

The above-described aspect may be provided with a rotating mechanism that rotates the laser light that has exited the optical conversion unit about an extended axis of the incident optical axis.

When the laser light that is made incident on the focusing lens is rotated on the cylindrical surface in the circumferential direction by means of the rotating mechanism, the laser light that is radiated onto the specimen from the focusing lens is also rotated about the optical axis of the focusing lens. In the case in which the laser light to be radiated onto the specimen from the focusing lens is divided into a small number of parts and the laser light contains speckle noise caused by the coherence of the laser light, this speckle noise is also rotated in the illumination region of the laser light, as shown in FIGS. 9(a) and 9(b), and the contrast in the illumination region caused by the speckle noise is time averaged, thus being decreased to a level that cannot be visually recognized. By doing so, it is possible to illuminate the specimen practically without generating any speckle noise.

In the above-described aspect, the rotating mechanism may rotate the diffraction grating about a rotation axis that is parallel to the incident optical axis.

By doing so, in association with the rotation of the diffraction grating, the laser light that has exited the diffraction grating can be rotated about the extended axis of the incident optical axis. Here, the position and direction of the main optical axis of the laser light that exits the diffraction grating are not dependent on the relative positional relationship among the center axis of the diffraction grating itself, the rotation axis of the diffraction grating based on the rotating mechanism, and the incident optical axis. Specifically, it suffices that the diffraction grating be placed at a position at which the laser light from the light source is made incident, and thus, it is not necessary to perform precise alignment of the diffraction grating with respect to the optical devices in the surrounding area thereof. Furthermore, because the diffraction grating is a small plate-like member, even at a high rotational speed of 10000 rotations per minute or greater, it is possible to achieve stable rotation.

In the above-described aspect, it is preferable that the rotating mechanism rotate the optical conversion unit at a rotational speed of 1/T rotations per second or greater, assuming that an exposure time of an image-acquisition device, which acquires an image of observation light emitted from the specimen due to irradiation with the laser light, is T seconds.

By doing so, by rotating the laser light that illuminates the specimen once (360°) or more while the image-acquisition device is exposed to observation light the amount of which corresponds to one frame, the illuminance distribution is time averaged over the entire illumination region of the laser light. By doing so, it is possible to acquire an image that does not contain speckle noise with the image-acquisition device and that is equivalent to an image acquired when the specimen is illuminated by using laser light having an even illuminance distribution.

REFERENCE SIGNS LIST 1, 100 microscope
2 stage
3 liquid-immersion objective lens (focusing lens)
4, 40 microscope illumination apparatus
7, 16 diffraction grating (optical conversion unit)
8 axicon lens (optical device)
15 focusing lens (lens: optical conversion unit)
17 rotating mechanism
P pupil position
Q conjugated position
S specimen
S1 first step
S2 second step
S3 third step
S4 fourth step
S5 fifth step

The invention claimed is:

1. A microscope illumination apparatus comprising:
an optical conversion unit that is configured to convert incident laser light, which is emitted from a light source and is incident on the optical conversion unit, to laser light that has an NA and whose main optical axis is distributed on a conical surface that widens at a predetermined angle with respect to an incident optical axis of the incident laser light, and from which the laser light exits; and
an optical device that has no refractive power and that is configured to deflect the laser light, which has exited the optical conversion unit, in a direction parallel to the incident optical axis,
wherein the microscope illumination apparatus is configured to focus laser light that has exited the optical device at a pupil position of a focusing lens for illuminating a specimen or a position that is conjugate with the pupil position, such that the laser light is focused to form a ring-like pattern that is continuous in a circumferential direction or to form a ring-like pattern having plural spots with gaps therebetween in the circumferential direction, and wherein the focused laser light is collimated by the focusing lens and is incident on the specimen at an angle from circumferential directions of the focusing lens.

2. The microscope illumination apparatus according to claim 1, wherein the optical conversion unit comprises a diffraction grating that deflects laser light and that gives an NA thereto.

3. The microscope illumination apparatus according to claim 1, wherein the optical conversion unit comprises a lens that has positive refractive power for giving an NA to laser light and a diffraction grating that deflects the laser light.

4. The microscope illumination apparatus according to claim 1, wherein the optical conversion unit is configured to convert the incident laser light to laser light that is continuously distributed over an entire circumference of the conical surface.

5. The microscope illumination apparatus according to claim 1, wherein the optical device is configured to be movable in a direction parallel to the incident optical axis of the incident laser light.

6. The microscope illumination apparatus according to claim 1, further comprising a rotating mechanism that is configured to rotate the laser light that has exited the optical conversion unit about an extended axis of the incident optical axis.

7. The microscope illumination apparatus according to claim 6, wherein the rotating mechanism is configured to rotate the optical conversion unit about a rotation axis that is parallel to the incident optical axis.

8. The microscope illumination apparatus according to claim 6, wherein the rotating mechanism is configured to rotate the optical conversion unit at a rotational speed of 1/T rotations per second or greater, with T being an exposure time in seconds of an image-acquisition device which is configured to acquire an image of observation light emitted from the specimen due to irradiation with the laser light.

9. A microscope comprising:
the microscope illumination apparatus according to claim 1;
a stage on which the specimen is placed; and
the focusing lens, which is disposed so as to face the specimen placed on the stage.

10. The microscope illumination apparatus according to claim 1, wherein the microscope illumination apparatus is configured to focus the laser light at a position whereby evanescent light is generated by total reflection of the laser light and the generated evanescent light is irradiated onto the specimen.

11. A microscope illumination method comprising:
a first step of converting laser light emitted from a light source to laser light that has an NA has and whose main optical axis is distributed on a conical surface that widens at a predetermined angle with respect to an incident optical axis of the laser light;
a second step of deflecting the laser light converted in the first step in a direction parallel to the incident optical axis by using an optical device having no refractive power;
a third step of focusing the laser light deflected in the second step at a pupil position of a focusing lens for illuminating a specimen or a position that is conjugate with the pupil position, such that the laser light is focused to form a ring-like pattern that is continuous in a circumferential direction or to form a ring-like pattern having plural spots with gaps therebetween in the circumferential direction, and such that the focused laser light is collimated by the focusing lens and is incident on the specimen at an angle from circumferential directions of the focusing lens; and a fourth step of moving the optical device in a direction parallel to the incident optical axis of the laser light.

12. The microscope illumination method according to claim 11, further comprising a fifth step of rotating the laser light focused in the third step at the pupil position of the focusing lens or the position that is conjugate with the pupil position about an extended axis of the incident optical axis.

* * * * *